United States Patent
Bauer

(10) Patent No.: US 8,906,558 B2
(45) Date of Patent: Dec. 9, 2014

(54) COLLECTION STRUCTURE IN BATTERIES

(75) Inventor: Harald Bauer, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/199,081

(22) Filed: Aug. 17, 2011

(65) Prior Publication Data
US 2012/0214059 A1 Aug. 23, 2012

(30) Foreign Application Priority Data
Sep. 10, 2010 (DE) .......................... 10 2010 040 538

(51) Int. Cl.
| | |
|---|---|
| H01M 4/64 | (2006.01) |
| H01M 4/70 | (2006.01) |
| H01M 10/052 | (2010.01) |
| H01M 10/0585 | (2010.01) |
| H01M 4/66 | (2006.01) |
| H01M 4/72 | (2006.01) |

(52) U.S. Cl.
CPC .............. *H01M 4/70* (2013.01); *H01M 10/052* (2013.01); *H01M 10/0585* (2013.01); *H01M 4/661* (2013.01); *H01M 4/667* (2013.01); *H01M 4/72* (2013.01); *Y02T 10/7011* (2013.01); *Y02E 60/122* (2013.01)
USPC .......................................... 429/233; 429/211

(58) Field of Classification Search
CPC ........... H01M 4/72; H01M 4/80; H01M 4/73; H01M 4/74
USPC .................................... 429/233, 211
See application file for complete search history.

(56) References Cited

U.S. PATENT DOCUMENTS

| | | | | |
|---|---|---|---|---|
| 5,525,441 A | * | 6/1996 | Reddy et al. | ................... 429/127 |
| 6,245,462 B1 | * | 6/2001 | Kao et al. | ...................... 429/241 |

\* cited by examiner

*Primary Examiner* — Zachary Best
(74) *Attorney, Agent, or Firm* — Kenyon & Kenyon LLP

(57) ABSTRACT

An electrode in a battery, e.g., a lithium-ion battery, has an electrically conductive carrier foil including (i) a terminal region for connection to an electrical circuit and (ii) at least one electrically conductive structure element configured to reduce the electrical resistance between the terminal region and a point on the carrier foil in order to improve electrical collection via the terminal region.

14 Claims, 2 Drawing Sheets

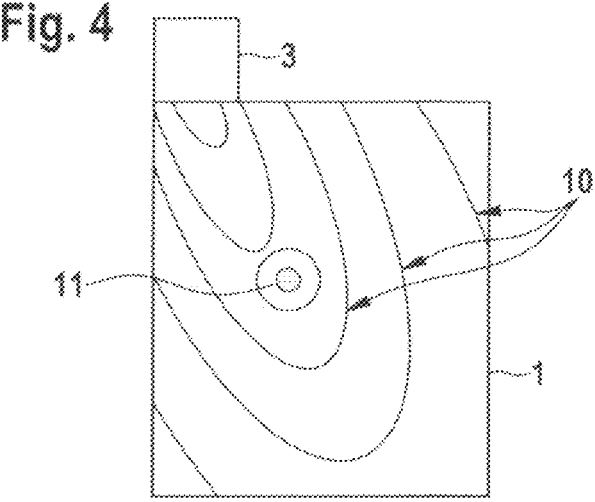
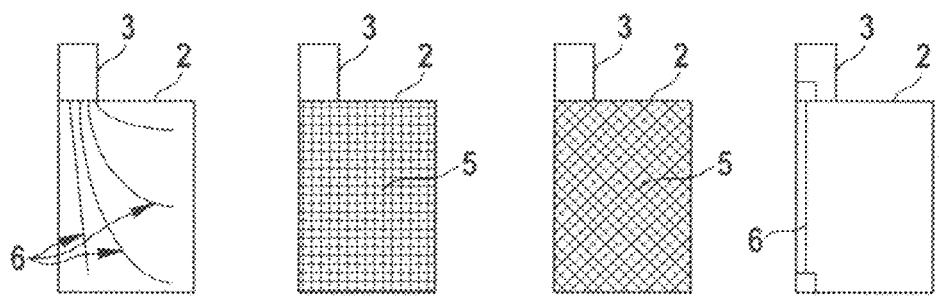
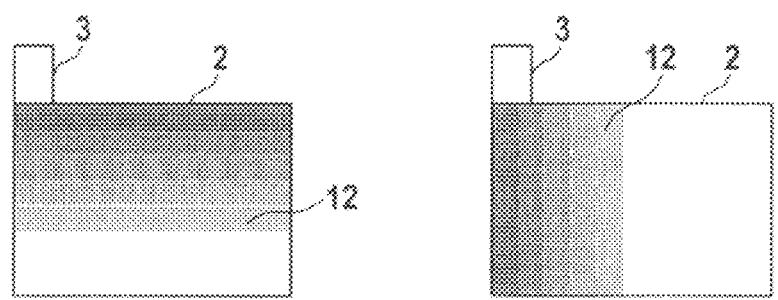

COLLECTION STRUCTURE IN BATTERIES

BACKGROUND OF THE INVENTION

1. Field of the Invention

The present invention relates to improved collection structures for collecting electrical energy in batteries, e.g., a lithium-ion battery, and relates in particular to an electrode which has an electrically conductive carrier foil having a terminal region for connection to an electrical circuit, and in which, in order to improve electrical collection via the terminal region, the carrier foil has at least one electrically conductive structure element by way of which the electrical resistance between the terminal region and a point on the carrier foil is decreased.

2. Description of the Related Art

In order to manufacture batteries such as, for example, lithium-ion batteries, an active layer is applied onto an electrically conductive collector. For example, graphite-containing pastes or nanocrystalline amorphous silicon having lithium inclusions, or also lithium mixed oxides such as $Li_4Ti_{-5}O_{12}$, $LiCoO_2$, $LiNiO_2$, $LiMn_2O_4$, lithium iron phosphate ($LiFePO_4$), or tin dioxide ($SnO_2$) can be applied as an active layer onto a carrier foil serving as a collector. Copper foil or aluminum foils can be used, for example, as carrier foils. It is also known to use networks or foams made of, for example, nickel as carrier foils. Coated carrier foils of this kind are assembled as an anode and/or cathode to form a battery, and incorporated into a package, a separator being provided between the anode and cathode. The package can be embodied as a pouch, layer being placed upon layer in sandwich fashion (e.g. anode-separator-cathode) and a usually square packet being constituted. Alternatively, an anode-separator-cathode unit can be rolled up, thus yielding the cells known, for example, from the laptop computer sector.

The packages thereby obtained are filled with an electrolyte. Suitable electrolytes are, for example, salts such as $LiPF_6$ or $LiBF_4$ in anhydrous aprotic solvents such as, for example, ethylene carbonate or diethylene carbonate, etc. Also suitable are polymers made up of polyvinylidene fluoride (PVDF) or polyvinylidene fluoride-hexafluoropropene (PVDF-HFP), as well as $Li_3PO_4N$ (lithium phosphate nitride). These can be present and introduced both in liquid form and as a gel or solid.

A cell of this kind can be electrically contacted via an electrically conductive collector, which must have a cross section sufficient for the current intensity that needs to be handled.

As a rule, multiple small cells are connected together, with a high degree of wiring complexity, for a high-performance overall system. An alternative possibility, in order to avoid such wiring complexity, is to produce correspondingly large-area electrodes.

The difficulty then exists, during the charging and discharging of such a battery, that the current generated incrementally in the surface area of the electrode flows out of all regions of the electrode toward the collector. The result is that the current density in the electrode rises continuously in the direction of the collector.

Electrical conduction is often associated with losses, which become evident as local heating of the battery. Defects in the ideal disposition, for example an irregular coating, excessively large particles in the layer, inhomogeneous compression of the electrodes, or the like, result additionally in an inhomogeneous current flow in the electrode. Local or zonal overheating of the battery can therefore occur; this can result in premature aging, capacity loss, or even thermal damage to the battery.

BRIEF SUMMARY OF THE INVENTION

The present invention provides an electrode, e.g., for use in a battery, that has an electrically conductive carrier foil having a terminal region for connection to an electrical circuit, which electrode is characterized in that in order to improve electrical collection via the terminal region, the carrier foil has at least one structure element, having an elevated electrical conductivity as compared with the carrier foil, by way of which the electrical resistance between the terminal region and a point on the carrier foil is reduced.

It has been found, surprisingly, that the provision of such a structure element can greatly decrease or even eliminate the risk of local or zonal overheating of the battery.

The electrically conductive structure increases the conductivity of the electrode in a freely selectable preferred direction, so that the voltage drop across, in particular, large electrode surfaces can be kept low. Local disruptions also have much less of an effect, since a current path that is sufficiently dimensioned thanks to the structure element can intercept current spikes.

With a suitable configuration of the conductive structure, it is likewise possible to influence the temperature field in the electrode. The temperature conductivity in the carrier foil is, as a rule, low. As a result of the conductive structure according to the present invention on the carrier foil it is possible, provided said structure is also embodied as a structure having high thermal conductivity, to distribute the temperature in the electrode.

A further advantage is the fact that a foil of lower conductivity or thickness can be used. In the case of conventional foils, the thickness of the foil must be selected so that upstream from the collector that is to be connected, the thickness of the foil is already sufficient that the current is not unnecessarily limited. The same quantity of current occurs in every surface region of the electrode. The collector is provided, however, only in a specific region of the electrode, so that the foil in the vicinity of the collector must also transport the quantities of current occurring in the surface regions located farther away from the collector. Taking the theoretical case of an electrode surface split into halves, that half of the surface that carries the collector must therefore have twice the thickness of the second half in order to ensure sufficient current transport. In practice, foil thicknesses of correspondingly greater dimensions over the entire surface are therefore used in order to avoid limiting the current flow in the terminal region. While this can be of lesser relevance for small cells such as those utilized, for example, in computer technology sectors, it cannot be ignored for large cells, for example such as those used as drive batteries in the automotive sector, since the result is an increase in weight without providing more storage capacity.

In an embodiment of the invention, the conductive structure element is constituted by grid- or rib-shaped conductor elements and/or by a graduated profile of the thickness of the electrically conductive carrier foil.

In a further embodiment of the invention, structure elements are applied onto the carrier foil by electrodeposition, using printing technologies, and/or using joining technologies.

"Applied by electrodeposition" means that metal layers are deposited onto the surface of the carrier foils. This can occur both autocatalytically or by application of a suitable deposition current as a direct current or even a pulsed current. In principle, all electrodeposition methods known from the field of circuit board production for the application of structures can be used in this context. The structures can be deposited at any thickness. They are preferably deposited at a thickness between 5 μm and 500 μm. Deposition at this thickness on the one hand ensures sufficient conductivity for the structure, and on the other hand the weight added by the structure can be minimized.

Suitable materials from which the conductive structures can be formed in such a case are, for example, copper, palladium, silver, gold, tin, or also alloys of these metals, including with other metals.

In addition to exclusively material-applying methods, material-removing methods can also be used, in which firstly a metal layer is applied onto a carrier foil which is then removed again, if applicable by way of a photoresist and with structuring by way of a mask.

Provision can likewise be made that, for example using a photoresist and a mask, a suitable structure is applied onto a, for example, copper foil, and excess material is removed from the carrier foil in an etching step. The result is that the weight of the carrier foil is reduced, and at the same time conductive structure elements are formed.

The structures can, however, also be applied onto the carrier foil using the printing technologies that are likewise known today from the circuit board manufacturing sector. Methods such as screen printing, transfer printing, blade-coat printing, offset printing, spraying, spin coating, or stamping are particularly suitable in this context. Conductive inks or even conductive polymers can be used here as materials.

In a further embodiment of the invention, provision can be made to use a combination of printing technology and electrodeposition to form the conductive structure elements. In a first step, structures are applied onto the foil using printing technologies, and in a further method step are surface-metallized by electrodeposition using a deposition current. Structure elements of correspondingly sufficient electrical conductivity are thereby created on the carrier foil.

In addition, the conductive structures can also be applied onto the carrier foil using joining technologies. Here the conductive structures are prefabricated separately, and then joined to the carrier foil. Techniques suitable here are, for example, those such as adhesive bonding using conductive adhesives, welding, soldering, contact pressing, or impressing.

In a further embodiment of the invention, the carrier foil is a foil, a network, or a foam made of copper, aluminum, nickel, or an alloy of at least one of said metals.

In a further embodiment of the invention, the conductive structure element is constituted by a further foil, joined to the carrier foil, that extends at least over a sub-region of the carrier foil, in particular over the region in the vicinity of the collector. Provision can be made in particular according to the present invention that in order to constitute a carrier foil, multiple foils are joined together so as to result in a graduated profile of the overall thickness of the carrier foil from the end of the carrier foil remote from the collector toward the collector.

In this context, the electrical resistance decreases gradually from the remote end toward the collector.

In a further embodiment of the invention, provision can be made that electrically conductive structure elements are applied onto a first carrier foil, and a further carrier foil is applied onto this first carrier foil to be equipped with electrically conductive structure elements, so that a sandwich structure results. The carrier foils and the conductive structure elements are fitted together in electrically conductive fashion, for example by adhesive bonding with an electrically conductive adhesive or by welding. In this context, for example, gold threads can be embedded as conductive structure elements between two copper carrier foils.

The invention furthermore proposes a battery that has an electrode, as an anode and/or cathode, constructed as described previously. It proposes in particular lithium-ion batteries that have an electrode according to the present invention as described above at least as an anode.

The invention furthermore proposes a method for manufacturing a battery, having at least the steps of:

providing an electrically conductive carrier foil having a terminal region;

applying onto the carrier foil at least one structure element (4) having an elevated electrical conductivity;

applying an active layer onto the carrier foil equipped with the structure element, the structure element being connected in electrically conductive fashion to the terminal region in order to form an electrode;

combining at least two electrodes in order to form a battery stack, the electrodes being respectively embodied alternately as an anode and cathode, and a separator being provided between the individual electrodes;

electrically connecting the respective anode and cathode to one another to form a negative and a positive pole of the battery.

Batteries that have electrodes according to the present invention or have been produced in accordance with the method according to the present invention can be used especially advantageously as drive batteries in the automotive sector.

BRIEF DESCRIPTION OF THE DRAWINGS

FIG. 4 shows the temperature distribution in a battery electrode according to the existing art when a defect is present.

FIG. 5 shows battery electrodes according to the present invention having electrically conductive structure elements.

FIG. 6 shows a battery electrode according to the present invention having a carrier foil with a graduated profile.

DETAILED DESCRIPTION OF THE INVENTION

Figure 1:
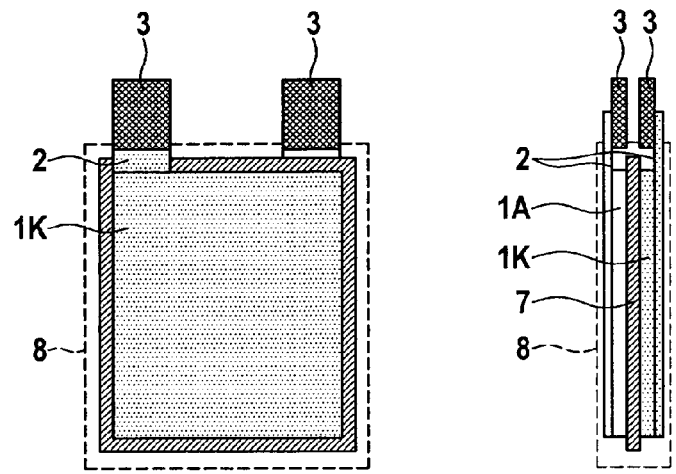
FIG. 1 shows the general construction of a battery pack.

FIG. 1 shows the general construction of a battery pack. The battery pack is made up of an anode 1A and a cathode 1K that are separated from one another by a separator 7. Separator 7 acts in electrically insulating fashion, but is permeable to ions. Suitable materials for use as separators 7 are, for example, microporous plastics, or glass-fiber or polyethylene mats. Cathode 1K and anode 1A are constructed from a carrier foil 2 and applied cathode and anode material, respectively. Copper foil, nickel foil, or aluminum foils, for example, can be used as carrier foil 2. Lithium mixed oxides such as $Li_4Ti_5O_{12}$, $LiCoO_2$, $LiNiO_2$, $LiMn_2O_4$, or lithium iron phosphate ($LiFePO_4$), for example, can be used as cathode material. Graphite-containing pastes, nanocrystalline amorphous silicon, or tin dioxide ($SnO_2$), for example, can be used as anode material. Electrodes 1 have a terminal region 3 which serves as an electrical collector and through which electrical contacting of electrodes 1 to a circuit occurs. The sequence of anode 1A, cathode 1K, and separator that is shown can repeat in sandwich fashion in order to obtain higher-power battery cells. The cells are insulated from the environment by way of a battery package 8.

Figure 2:
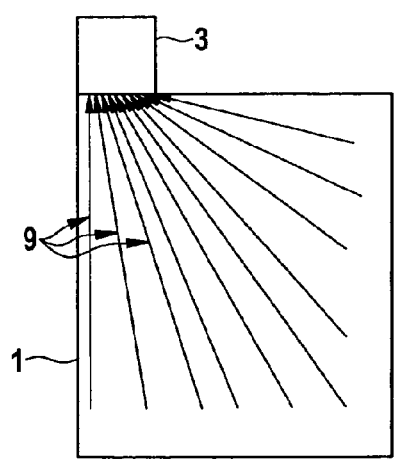
FIG. 2 shows the current flow in a battery electrode according to the existing art.

FIG. 2 shows, in abstract fashion, the current flow inside an electrode 1 of a battery according to the existing art, shown here for an anode. The electron flow produced or occurring in the electrode surface is symbolized by arrows 9. In the case of the anode, current flows out of the surface toward terminal region 3, and correspondingly oppositely in the case of the cathode, from terminal region 3 toward the surface of the electrode. An elevated current density prevails in the vicinity of collector 3, since it is through this region, similar to a bottleneck, that the entire electrical output of electrode 1 must be passed.

Figure 3:
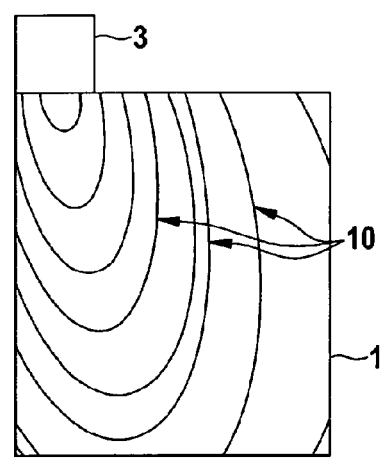
FIG. 3 shows the temperature distribution in a battery electrode according to the existing art.

FIG. 3 shows the temperature distribution in a battery electrode according to the existing art. The density of isotherms 10 rises with increasing proximity to terminal region 3. Because of the electrical resistance of electrode 1, the elevated current density in the vicinity of terminal region 3 results in intensified thermal radiation in this region, which in an extreme case can cause thermal overloading of the battery. A thermal overload of this kind can result in thermal damage to the electrolyte, the electrode material, or even the carrier foil, which can lead to a complete loss of cell functionality.

Especially when defects 11 are present in electrode 1, as shown in FIG. 4, thermal effects can also occur within the electrode surface. Such defects 11 can arise, for example, because of irregular coating of carrier foil 2 with active material, excessively large particles in the active material, or also irregular contact pressure of electrodes 1 against separator 7. Such defects 11 also form regions of elevated electrical resistance or elevated current density, so that thermal effects can occur there.

FIG. 5 shows battery electrodes according to the present invention having electrically conductive structure elements 5, 6. Grid- and/or rib-shaped electrically conductive structure elements 5, 6 are applied on a carrier foil 2. Structure elements 5, 6 can be applied onto carrier foil 2 by electrodeposition, using printing technologies, and/or using joining technologies. The conductive structure elements 5, 6 applied in rib- or grid-shaped fashion onto carrier foil 2 produce high-conductivity paths out of the electrode surface toward terminal region 3 (in the case of the anode), or from terminal region 3 toward the electrode surface (in the case of the cathode). Current density spikes in the area surrounding terminal region 3 are thereby avoided, so that thermal stresses in this region can in turn be avoided. Because the electrically conductive structure elements 3 generally also possess good thermal conductivity in addition to good electrical conductivity, structure elements 3 also enable the dissipation or distribution of locally occurring thermal spikes, so that thermal overload can be avoided on the one hand thanks to the decreased electrical resistance and on the other hand as a result of the distribution of locally occurring thermal energy into other regions. Both electrical and thermal loads are thus, according to the present invention, distributed more evenly over the entire surface of electrode 1. The result is to reduce not only stress in the vicinity of the terminal region, but also point loads in electrode 1 caused by any defects.

FIG. 6 shows a battery electrode 1 according to the present invention having a carrier foil 2 having a graduated profile 12. A "graduated profile" 12 of carrier foil 2 is to be understood according to the present invention to mean that the electrical and/or thermal resistance of carrier foil 2 decreases in the direction toward terminal region 3. This can be accomplished, for example, by the fact that with increasing proximity to terminal region 3, layers having a low electrical resistance are applied onto carrier foil 2. This can occur, as explained above, using electrodeposition technologies, printing technologies, or joining technologies. In this regard, in an embodiment of this kind according to the present invention the electrically conductive structure elements are embodied in planar fashion. Provision can be made here in particular that with decreasing distance toward terminal region 3, multiple foil layers on top of one another are joined onto carrier foil 2, for example by being adhesively bonded or welded to one another. This results in an electrical resistance profile gradually decreasing from the edge regions of electrode 1 toward terminal region 3. Provision can furthermore be made according to the present invention that in order to generate a graduated electrical conductivity profile of this kind, foils of differing conductivity are joined together to form a carrier foil 2, so that the carrier foil used in the edge region of electrode 1 has a higher electrical resistance than in the area surrounding terminal region 3. For this purpose, for example, foils made of the same material but having a different thickness can be joined together by adhesive bonding or welding.

What is claimed is:

1. An electrode having reduced local heating, comprising:
   an electrically conductive carrier foil including:
      a terminal region for connection to an electrical circuit; and
      at least one electrically conductive structural element that:
         includes at least one conductive path;
         is structured with at least one of less electrical resistance and less thermal resistance in an area surrounding the terminal region than in another region of the electrode that is farther from the terminal region than the surrounding area; and
         is formed at least in part by a graduated profile of a thickness of the electrically conductive carrier foil.

2. The electrode as recited in claim 1, wherein the at least one electrically conductive structural element includes at least one of a grid-shaped conductor element and a rib-shaped conductor element.

3. The electrode as recited in claim 1, wherein the at least one electrically conductive structural element is integrated with the carrier foil by application of the electrically conductive structural element onto a base layer of the carrier foil by at least one of electrodepositing, printing, and joining.

4. The electrode as recited in claim 1, wherein the carrier foil includes at least one of copper, aluminum, and nickel.

5. The electrode as recited in claim 1, wherein the electrically conductive structural element is formed by a foil joined to a base layer of the carrier foil.

6. The electrode as recited in claim 1, wherein the electrode is part of a lithium-ion battery.

7. A method for manufacturing a battery, comprising:
   providing an electrically conductive carrier foil including:
   a terminal region; and
   at least one electrically conductive structural element that:
      (i) includes at least one conductive path;
      (ii) is structured with at least one of less electrical resistance and less thermal resistance in an area surrounding the terminal region than in another region of the electrode that is farther from the terminal region than the surrounding area; and
      (iii) is formed at least in part by a graduated profile of a thickness of an electrically conductive carrier foil;
   applying an active layer onto the carrier foil, wherein the electrically conductive structural element is connected in electrically conductive fashion to the terminal region to form an electrode;

combining at least two electrodes in order to form a battery stack, the two electrodes being respectively embodied as an anode and cathode, and a separator being provided between the individual electrodes; and electrically connecting the respective anode and cathode to one another to form a negative and a positive pole of the battery.

8. The method as recited in claim 7, wherein the at least one electrically conductive structural element is applied onto a base layer of the carrier foil by at least one of electrodepositing, printing, and joining.

9. The electrode as recited in claim 1, wherein, an electrical resistance decreases from at least one edge of the electrode to the terminal region.

10. The electrode as recited in claim 1 wherein the at least one electrically conductive element is dimensioned to prevent current spikes.

11. The electrode as recited in claim 2, wherein the at least one electrically conductive element comprises at least one of copper, palladium, silver, gold, and tin.

12. The electrode as recited in claim 1, wherein the at least one of the less electrical resistance and the less thermal resistance reduces a potential for a spike in a local heating in the terminal region.

13. An electrode, comprising:
an electrically conductive carrier foil including:
(a) a terminal region for connection to an electrical circuit; and
(b) at least one electrically conductive structural element (i) formed by a graduated profile of the thickness of the electrically conductive carrier foil and (ii) that includes at least one conductive path positioned on the carrier foil such that at least one of an electrical resistance and a thermal resistance of the at least one electrically conductive structural element is less in an area surrounding the terminal region than in another region of the electrode farther from the terminal region than the surrounding area.

14. An electrode having reduced local heating, comprising:
an electrically conductive carrier foil including:
a terminal region for connection to an electrical circuit; and
at least one electrically conductive structural element that:
includes at least one conductive path;
is structured with at least one of (a) a greater electrical spike prevention characteristic and (b) a greater thermal spike prevention characteristic in an area surrounding the terminal region than in another region of the electrode that is farther from the terminal region than the surrounding area; and
is formed as least in part by a graduated profile of a thickness of an electrically conductive carrier foil.

* * * * *